(12) United States Patent
Xu et al.

(10) Patent No.: US 12,042,731 B2
(45) Date of Patent: Jul. 23, 2024

(54) SWAPPING GAME WITH PLAYER AND ENEMY CHARACTERS

(71) Applicant: Shanghai Yiyu Network Technology Co., Ltd., Shanghai (CN)

(72) Inventors: Zhiqin Xu, Shanghai (CN); Mei Peng, Shanghai (CN)

(73) Assignee: Shanghai Yiyu Network Technology Co., Ltd., Shanghai (CN)

( * ) Notice: Subject to any disclaimer, the term of this patent is extended or adjusted under 35 U.S.C. 154(b) by 330 days.

(21) Appl. No.: 17/530,440

(22) Filed: Nov. 18, 2021

(65) Prior Publication Data

US 2023/0061515 A1    Mar. 2, 2023

Related U.S. Application Data

(63) Continuation of application No. PCT/CN2021/115039, filed on Aug. 27, 2021.

(30) Foreign Application Priority Data

Aug. 26, 2021   (CN) .......................... 202110991858.9

(51) Int. Cl.
```
A63F 13/52      (2014.01)
A63F 13/2145    (2014.01)
A63F 13/58      (2014.01)
A63F 13/822     (2014.01)
G06F 3/0486     (2013.01)
G06F 3/0488     (2022.01)
```

(52) U.S. Cl.
CPC .......... *A63F 13/58* (2014.09); *A63F 13/2145* (2014.09); *A63F 13/822* (2014.09); *G06F 3/0486* (2013.01); *G06F 3/0488* (2013.01)

(58) Field of Classification Search
None
See application file for complete search history.

(56) References Cited

U.S. PATENT DOCUMENTS

| | | |
|---|---|---|
| 11,278,808 B1 * | 3/2022 | Knutsson .............. A63F 13/822 |
| 2006/0205460 A1 * | 9/2006 | Shimosato ........... A63F 13/822 463/1 |
| 2014/0080601 A1 * | 3/2014 | Knutsson ............... A63F 13/35 463/31 |

(Continued)

FOREIGN PATENT DOCUMENTS

CN           109718545 A        5/2019

*Primary Examiner* — Lawrence S Galka

(57) ABSTRACT

A control method and apparatus of a virtual object, an electronic device, and a storage medium are disclosed. The method includes: receiving an object swap instruction on a pattern matrix of a first interface of a screen; swapping positions of a first pattern object and a second pattern object according to the object swap instruction, and upon detection that a predetermined number of pattern objects of the same type are connected after the positions of the first pattern object and the second pattern object are swapped, eliminating the connected pattern objects; increasing an energy value of a corresponding target defense object among all defense objects in the first interface according to the eliminated pattern objects; and attacking the attack object with stronger power when the energy value of the target defense object reaches a preset value.

9 Claims, 8 Drawing Sheets

(56) References Cited

U.S. PATENT DOCUMENTS

| | | | | |
|---|---|---|---|---|
| 2014/0274382 A1* | 9/2014 | Green | A63F 13/70 | |
| | | | 463/31 | |
| 2014/0295964 A1* | 10/2014 | Takeuchi | A63F 13/335 | |
| | | | 463/31 | |
| 2014/0342791 A1* | 11/2014 | Hugh | A63F 13/80 | |
| | | | 463/9 | |
| 2017/0072297 A1* | 3/2017 | Lehwalder | A63F 13/80 | |
| 2017/0072311 A1* | 3/2017 | Maejima | A63F 13/42 | |

* cited by examiner

SWAPPING GAME WITH PLAYER AND ENEMY CHARACTERS

CROSS REFERENCE TO RELATED APPLICATIONS

The present application is a Continuation Application of PCT Application No. PCT/CN2021/115039 filed on Aug. 27, 2021, which claims the benefit of Chinese Patent Application No. 202110991858.9 filed on Aug. 26, 2021. All the above are hereby incorporated by reference in their entirety.

TECHNICAL FIELD

The present disclosure relates to the technical field of computers, and in particular, to a control method and apparatus of a virtual object, an electronic device, and a storage medium.

BACKGROUND

For the combination of a tower defense game and a match-three game, a game interface is usually divided into two parts. The upper half of the interface shows an attack object in the tower defense game, where the attack object corresponds to an initial health point value, and a defense object corresponds to an initial defense value; the lower half of the interface shows a pattern matrix of the match-three game and the defense object, where each matrix element in the pattern matrix corresponds to a pattern object. The defense object, pattern objects and attack object are all virtual objects. The player swaps the positions of two adjacent pattern objects such that three or more identical pattern objects are connected together, and these identical pattern objects will be eliminated. While the pattern objects are eliminated, the defense object will attack the attack object in front of the pattern objects, to subtract a predetermined health point value from a current health point value of the attack object, so as to kill the attack object.

However, when the pattern objects are eliminated, the eliminated pattern objects can only trigger a fixed attack on the attack object, which cannot increase the intensity of the game, resulting in a long game duration, and thus each game requires high processing overheads of the terminal and the server.

SUMMARY

An objective of the present disclosure is to solve at least one of the technical problems in the prior art, and provide a control method and apparatus of a virtual object, and an electronic device, to reduce the game duration and reduce the processing overheads of the terminal and server.

According to a first aspect, an embodiment of the present disclosure provides a control method of a virtual object, including:

receiving an object swap instruction on a pattern matrix of a first interface of a screen, where the pattern matrix includes multiple matrix elements, and each matrix element is used for displaying a pattern object;

swapping positions of a first pattern object and a second pattern object according to the object swap instruction, and upon detection that a predetermined number of pattern objects of the same type are connected, eliminating the connected pattern objects, and subtracting a first preset health point value from a current health point value of an attack object in a second interface;

increasing an energy value of a corresponding target defense object among all defense objects in the first interface according to the eliminated pattern objects; and subtracting a second preset health point value from the current health point value of the attack object in response to a skill trigger instruction for the target defense object when the energy value of the target defense object reaches a preset value, where the second preset health point value is greater than the first preset health point value.

Further, the increasing an energy value of a corresponding target defense object among all defense objects in the first interface according to the eliminated pattern objects includes:

increasing, according to a pattern type of the eliminated pattern objects, the energy value of the target defense object corresponding to the pattern type in the first interface.

Further, the increased energy value is equal to the preset value.

Further, the subtracting a second preset health point value from the current health point value of the attack object in response to a skill trigger instruction for the target defense object when the energy value of the target defense object reaches a preset value includes:

when the energy value of the target defense object reaches the preset value, controlling the target defense object and each defense object within a preset range of the target defense object in the first interface to attack the attack object in response to the skill trigger instruction for the target defense object, so as to subtract the second preset health point value from the current health point value of the attack object.

Further, the second preset health point value is equal to the current health point value.

Further, the method further includes:

when display duration of the attack object in the second interface meets a preset condition, controlling the attack object to attack at least one defense object within a preset attack range of the attack object.

Further, the number of attacks by the attack object is in direct proportion with the display duration of the attack object in the second interface, the display duration is determined according to the current health point value of the attack object, and when the current health point value is less than a preset value, the attack object disappears in the second interface.

According to a second aspect, an embodiment of the present disclosure provides a control apparatus of a virtual object, including:

an instruction receiving module, configured to receive an object swap instruction on a pattern matrix of a first interface of a screen, where the pattern matrix comprises multiple matrix elements, and each matrix element is used for displaying a pattern object;

an object swap module, configured to swap positions of a first pattern object and a second pattern object according to the object swap instruction, and upon detection that a predetermined number of pattern objects of the same type are connected, eliminate the connected pattern objects, and subtract a first preset health point value from a current health point value of an attack object in a second interface;

a gain adding module, configured to increase an energy value of a corresponding target defense object among all defense objects in the first interface according to the eliminated pattern objects; and an attack control module, configured to subtract a second preset health point value from the current health point value of the attack object in response to a skill trigger instruction for the target defense object when the energy value of the target defense object reaches a preset value, where the second preset health point value is greater than the first preset health point value.

According to a third aspect, an embodiment of the present disclosure provides an electronic device, including a memory, a processor, and a computer program stored in the memory and runnable on the processor, where the processor, when executing the program, implements the control method of a virtual object described in the foregoing embodiment.

According to a fourth aspect, an embodiment of the present disclosure provides a storage medium, storing a computer executable instruction, where the computer executable instruction causes a computer to perform the control method of a virtual object described in the foregoing embodiment.

When the connected pattern objects are eliminated, the energy value of the corresponding target defense object among all the defense objects in the first interface is increased, such that when the energy value of the target defense object reaches the preset value, the attack object is attacked with stronger power, thereby breaking the limitation that only a fixed attack on the attack object can be triggered when the connected pattern objects are eliminated. In this way, the defense object obtains a gain during the elimination of the pattern objects, which improves the interactivity of the game. Moreover, when the energy value of the target defense object reaches the preset value, the attack object is attacked with stronger power, to improve the intensity of the game, which helps to improve the killing efficiency of the game, speed up the game process, and shorten the game duration, thus reducing the processing overheads of the terminal and the server.

BRIEF DESCRIPTION OF DRAWINGS

The following describes the present disclosure with reference to the accompanying drawings and embodiments.

DETAILED DESCRIPTION

The specific embodiments of the present disclosure are described in detail herein. The preferred embodiments of the present disclosure are shown in the accompanying drawings. The accompanying drawings are used to supplement the description of the textual part of the specification with graphics, such that people can vividly understand each technical feature of the present disclosure and the overall technical solution, but the accompanying drawings should not be understood as a limitation on the protection scope of the present disclosure.

Figure 1:
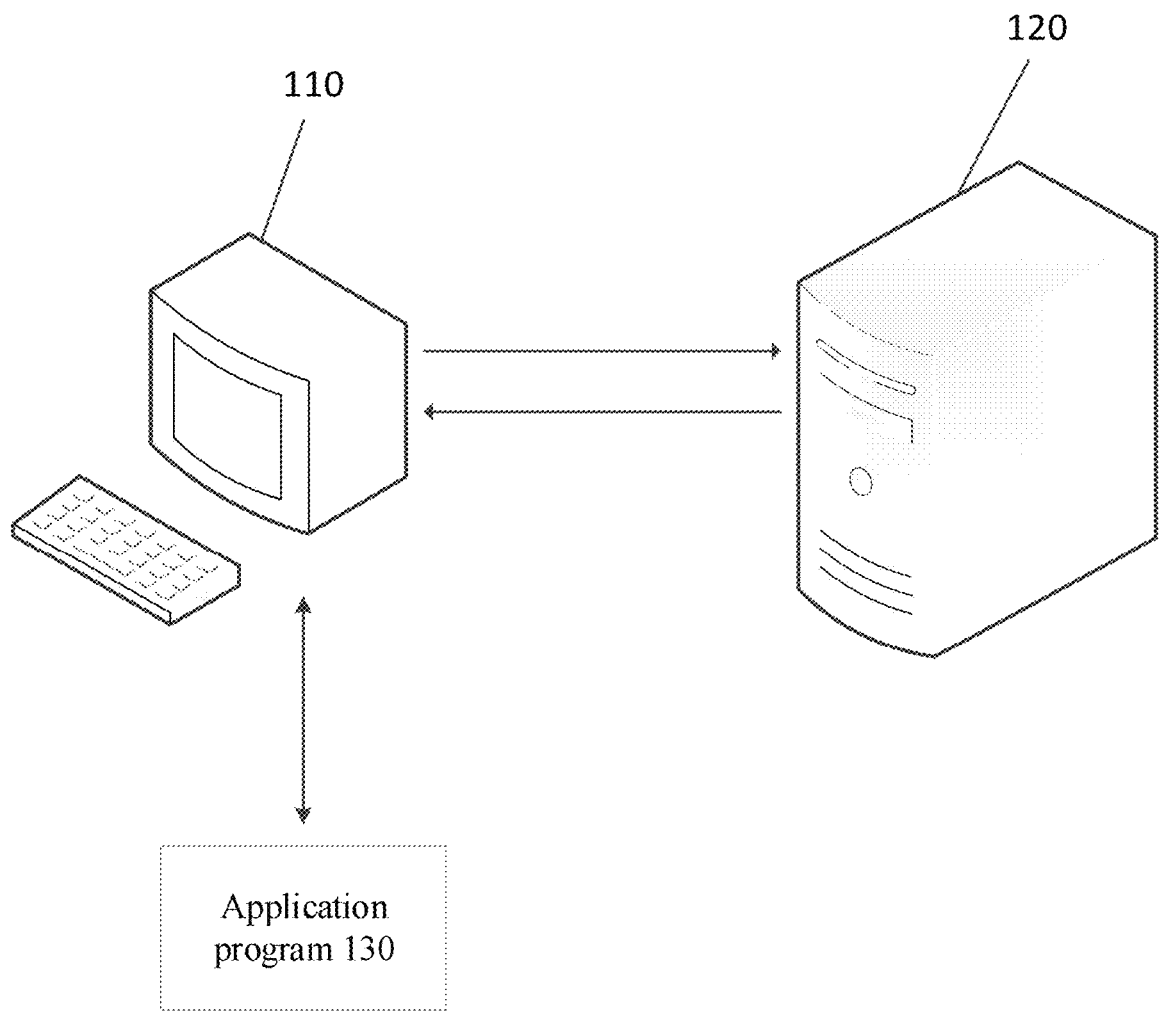
FIG. 1 is a diagram of an application environment of a control method of a virtual object according to an embodiment.

The embodiments of the present disclosure are described below with reference to the accompanying drawings. The control method of a virtual object provided in the embodiments of the present disclosure is applied to an application environment including a terminal device 110 and a server 120 as shown in FIG. 1. The terminal device 110 and the server 120 are connected via a network. The terminal device 110 may be a desktop terminal or a mobile terminal, where the mobile terminal may be one of a cell phone, a tablet computer, a laptop computer, a wearable device, etc. The server 120 may be implemented by an independent server or a server cluster composed of multiple servers, or may be a cloud server providing basic cloud computing services such as cloud services, a cloud database, cloud computing, cloud functions, cloud storage, network services, cloud communications, middleware services, domain name services, security services, CDN, and big data and artificial intelligence platforms. An application program 130 using the foregoing control method of a virtual object is displayed by the terminal device 110.

Figure 2:
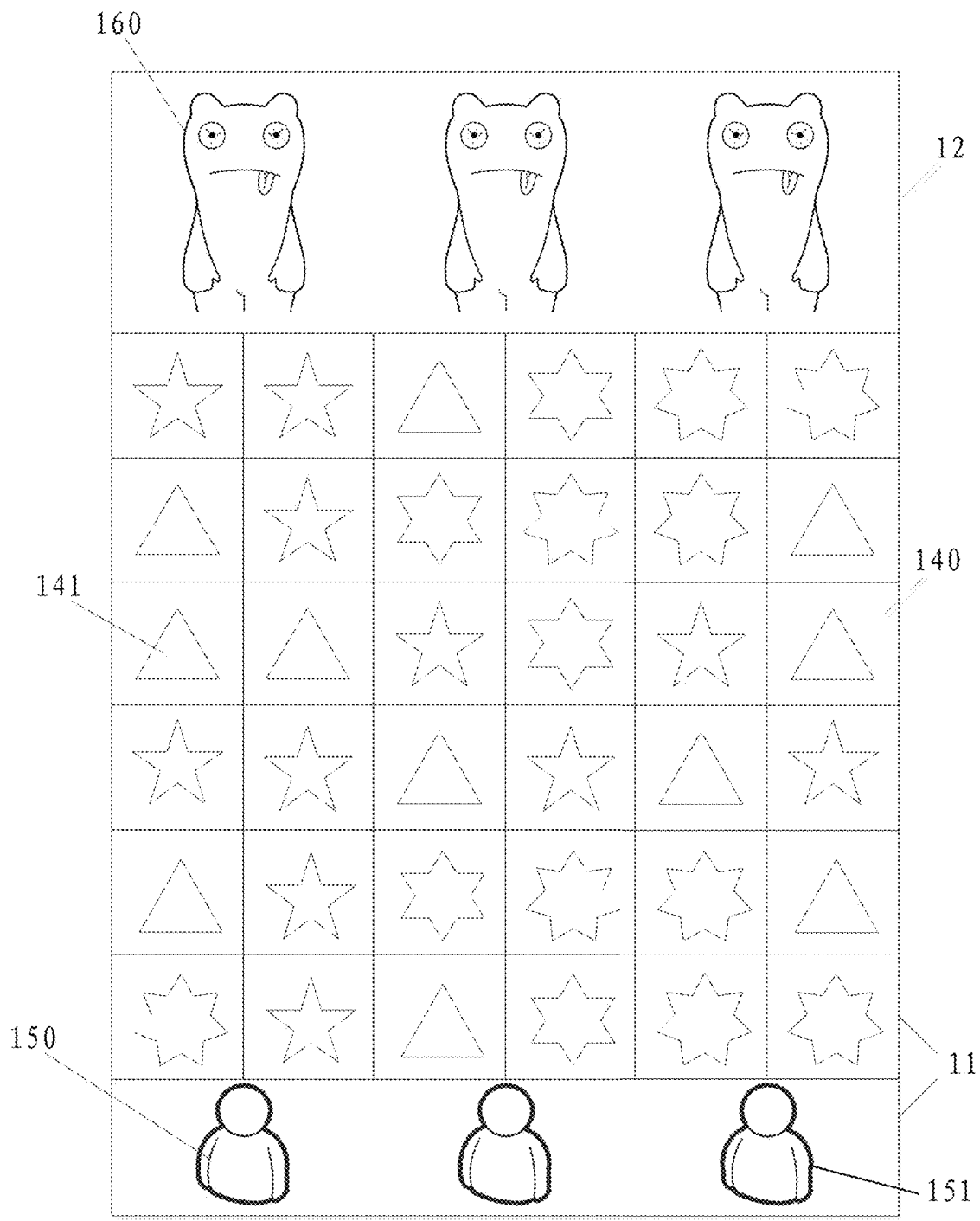
FIG. 2 is a schematic diagram of a user interface for a combination of a tower defense game and a match-three game according to an embodiment.

When the application program 130 is displayed by the terminal device 110, the terminal device 110 may display a user interface as shown in FIG. 2. The user interface is split into two parts, including a first interface 11 in the lower half and the second interface 12 in the lower half. The first interface displays a pattern matrix 140 of a match-three game and defense objects 150, where each matrix element in the pattern matrix 140 corresponds to one pattern object 141. A player swaps positions of two adjacent pattern objects 141, such that three or more identical pattern objects are connected together, and these identical pattern objects will be eliminated. Then, new pattern objects drop randomly, to fill the vacant positions that appear due to the elimination. The second interface displays attack objects 160 in a tower defense game. While the pattern objects are eliminated, the terminal device generates an attack instruction, such that a predetermined health point value is subtracted from a current health point value of the attack object 160. Then data generated after the predetermined health point value is subtracted from the current health point value is synchronized to the server. At the same time, an energy value of a target defense object 151 among all the defense objects in the first interface is increased according to the eliminated pattern object. Upon detection that the energy value of the target defense object reaches a preset value, the terminal device receives a skill trigger instruction sent by the user for the target defense object, to trigger a second attack on the attack object, to subtract a second preset health point value from the current health point value of the attack object, where the second preset health point value is greater than a first preset health point value. The attack object attacks the defense object at a regular time, such that a predetermined defense value is subtracted from a current defense value of the defense object. If the defense value of the defense object is reduced to 0, the game fails; if all attack objects are killed before the defense value of the defense object is reduced to 0, the player wins the game.

When the connected pattern objects are eliminated, the energy value of the corresponding target defense object among all the defense objects in the first interface is increased, such that when the energy value of the target defense object reaches the preset value, the attack object is attacked with stronger power, thereby breaking the limitation that only a fixed attack on the attack object can be triggered when the connected pattern objects are eliminated. In this way, the defense object obtains a gain during the elimination of the pattern objects, which improves the interactivity of the game. Moreover, when the energy value of the target defense object reaches the preset value, the attack object is attacked with stronger power, to improve the intensity of the game, which helps to improve the killing efficiency of the game, speed up the game process, and shorten the game duration, thus reducing the processing overheads of the terminal and the server.

The control method of a virtual object provided in the embodiments of the present disclosure will be illustrated in detail below through several specific embodiments.

Figure 3:
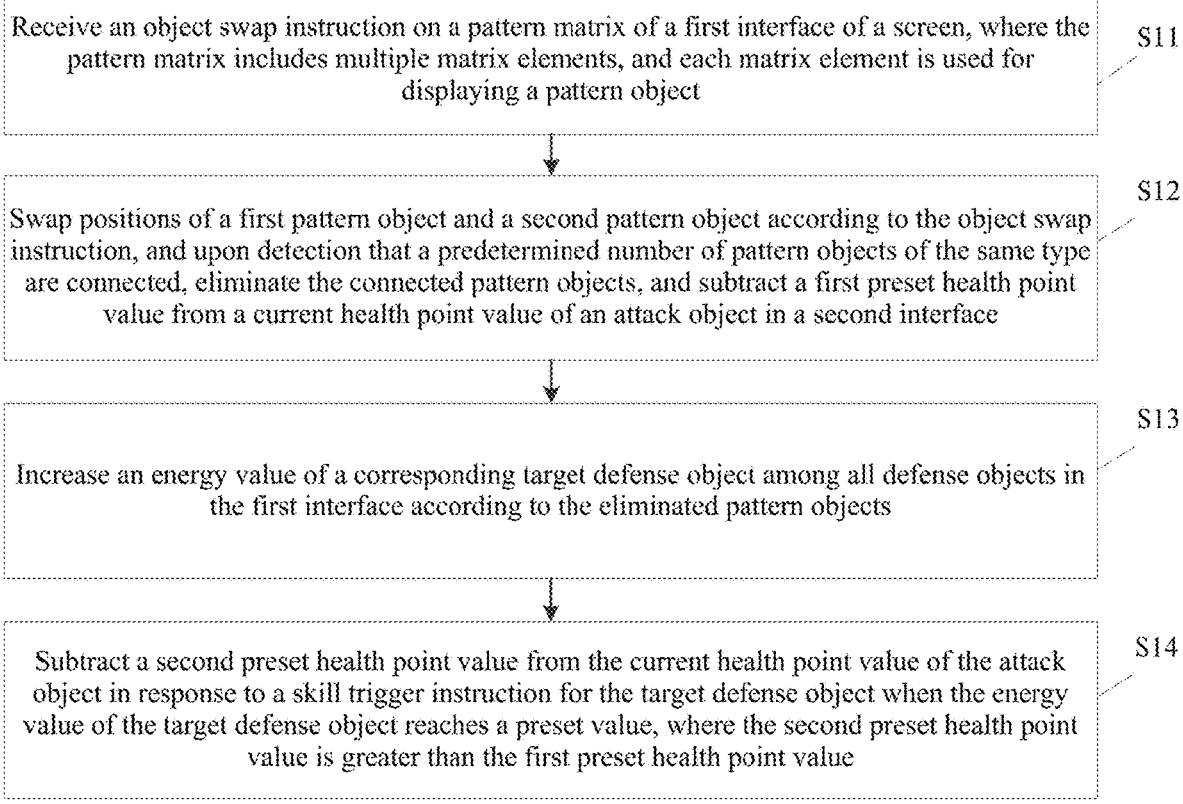
FIG. 3 is a schematic flowchart of a control method of a virtual object according to an embodiment.

As shown in FIG. 3, in an embodiment, a control method of a virtual object is provided. This embodiment is mainly described with an example in which the method is applied to a computer device. The computer device specifically may be the terminal device 110 in FIG. 1.

Referring to FIG. 3, the control method of a virtual object specifically includes the following steps:

S11: Receive an object swap instruction on a pattern matrix of a first interface of a screen, where the object swap instruction is generated according to a sliding operation applied on a first pattern object and a second pattern object that are adjacent in the pattern matrix, the pattern matrix includes multiple matrix elements, and each matrix element is used for displaying a pattern object.

In an embodiment, the screen of the terminal device displays a user interface of an application program, where the lower half of the user interface is the first interface having a pattern matrix with a predetermined size. The first interface includes multiple grids. As shown in FIG. 2, the first interface includes 6*6 grids, each grid corresponds to one matrix element, and all the grids form the pattern matrix.

In an embodiment, a frame is displayed in an area where each grid is located. The area where each grid is located is used for displaying a pattern object, which may be a pattern in a preset shape. Grids of different pattern objects may be distinguished through different backgrounds, for example, distinguished through different background colors, background styles, or background graphics.

For example, the screen is a touch screen of the terminal device. When receiving a touch operation of the user on the touch screen, the terminal device generates a corresponding control instruction. For example, when the terminal device receives the user's sliding operation from the position of the first pattern object to the position of the second pattern object on the touch screen, the terminal device generates an object swap instruction according to the sliding operation.

For example, the screen may alternatively be a display screen of the terminal device, and the terminal further includes an input device. The user operates the input device to trigger the terminal to generate a corresponding control instruction. For example, the terminal is a desktop computer. A mouse corresponds to an operation control on the screen. The screen displays the first interface. The user moves the mouse to control the operation control to move to the position of the first pattern object, then clicks the mouse to control the operation control to select the first pattern object, and holds and drags the mouse, such that the operation control moves to the position of the second pattern object while selecting the first pattern object. When the user releases the mouse, the terminal generates a pattern object swap instruction.

In an embodiment, the first pattern object is a pattern object displayed in the grid at the starting position of the sliding operation, and the second pattern object is a pattern object displayed in the grid at an end position of the sliding operation.

S12: Swap positions of a first pattern object and a second pattern object according to the object swap instruction, and upon detection that a predetermined number of pattern objects of the same type are connected after the positions of the first pattern object and the second pattern object are swapped, eliminate the connected pattern objects, and subtract a first preset health point value from a current health point value of an attack object in a second interface.

Figure 4:
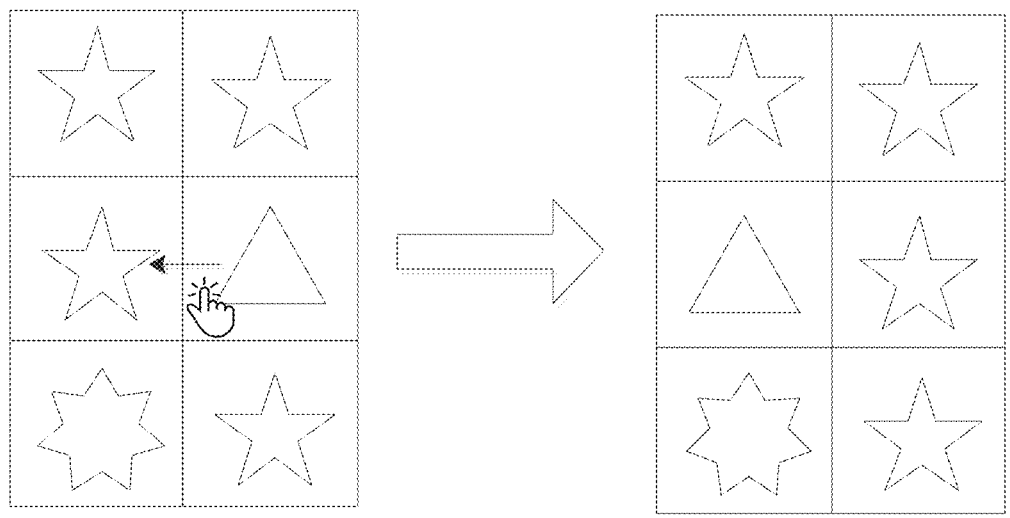
FIG. 4 is a schematic diagram of a sliding operation according to an embodiment.

In an embodiment, as shown in FIG. 4, the solid arrow represents a sliding direction of a finger, and an object swap instruction is generated when the finger slides. When receiving the object swap instruction, the terminal device moves the first pattern object in the left picture from the grid where it is originally located to the grid where the second pattern object in the right picture is originally located, and moves the second pattern object in the left picture from the grid where it is originally located to the grid where the first pattern object in the right picture is originally located. Then, it is detected whether a predetermined pattern objects of the same type are connected after the positions of the first pattern object and the second pattern object are swapped. If yes, the connected pattern objects are eliminated; otherwise, the first pattern object and the second pattern object return to the original positions. That is, the operation of swapping the positions of the first pattern object and the second pattern object is withdrawn, such that the first pattern object and the second pattern object return to the original positions before swapping.

In an embodiment, the connection is horizontal connection or vertical connection. For example, the predetermined number may be 3 or more, when 3 or more than 3 identical pattern objects are connected, the connected patterns will be eliminated. If 3 triangular patterns are connected, the 3 triangular patterns will be eliminated. The specific value of the predetermined number is set according to actual requirements.

Figure 5:
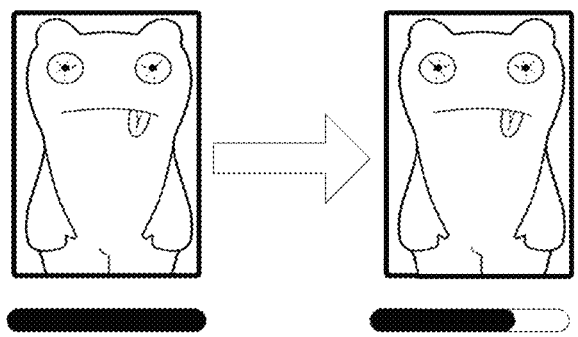
FIG. 5 is schematic diagram of a health point value of an attack object according to an embodiment.

In an embodiment, as shown in FIG. 5, when the pattern objects are eliminated, the first preset health point value to be subtracted from the attack object can be determined according to an attack value corresponding to the eliminated pattern objects and a defense value of the attack object in the second interface, such that when an attack instruction is generated according to the connected pattern objects, the first preset health point value is subtracted from the current health point value of the attack object in the second interface in the left part of the figure, and a result is displayed in the second interface in the right part of the figure. In this way, the user is informed that the attack object has been attacked.

The attack object is a non-player character, i.e., a game character not controlled by a real player in a game. The attack object is generally controlled by AI of a computer, and is a character having its own behavioral mode.

In an embodiment, the attack object from which the first preset health point value is subtracted can be determined according to a click operation of the user in the second interface. When the user's click operation on a certain attack object in the second interface is received, the clicked attack object is marked as a selected attack object. After the connected pattern objects are eliminated, the selected attack object will be found from multiple attack objects in the second interface, and after the attack object is found, an attack value is generated to attack the attack object.

To improve the game experience of the user, in an embodiment, different types of pattern objects correspond to different attack values. When the pattern objects are eliminated, the generated attack value for attacking the attack object is equal to the number of the eliminated pattern objects multiplied by a preset attack value corresponding to each pattern object.

S13: Increase an energy value of a corresponding target defense object among all defense objects in the first interface according to the eliminated pattern objects.

Figure 6:
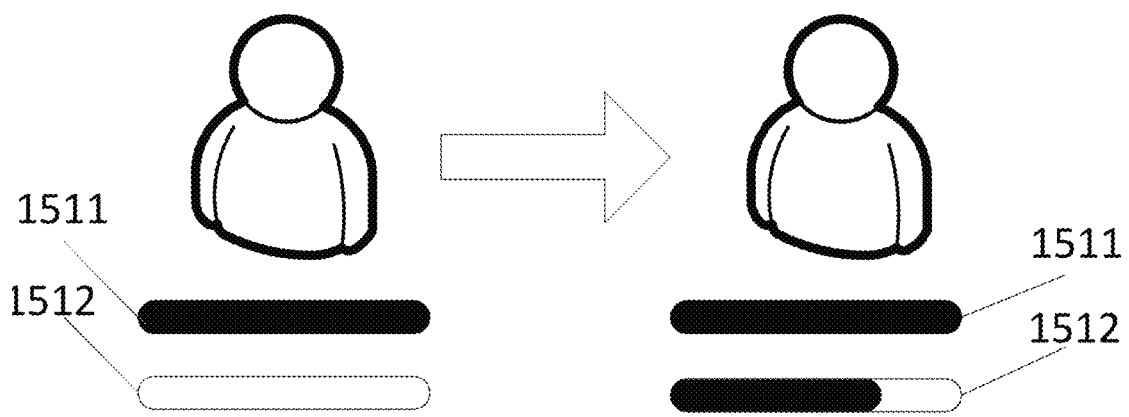
FIG. 6 is a schematic diagram of an interface of an energy value of a defense object according to an embodiment.

In an embodiment, as shown in FIG. 6, a current health point value 1511 and an energy slot 1512 of a defense object is displayed in the first interface in the left part of the figure, and an initial value of the energy slot is 0 at the beginning of the application program. When the pattern objects are eliminated, a corresponding energy value will be generated to fill the energy slot, to form the right part of the figure, so as to represent that the energy value of the defense object is increased. The increased energy value of the target defense object each time when the pattern objects are eliminated may be a fixed value, and the specific value may be set according to actual situations.

In an embodiment, a random defense object can be directly selected from the defense objects to serve as the target defense object, or the target defense object may be determined according to the user's click operation in the first interface. When the user's click operation on a defense object in the first interface is received, the clicked defense object is marked as the target defense object. When the pattern objects are eliminated, the target defense object selected by the user may be found, to increase the energy value of the target defense object. If there is no target defense object selected by the user, a random defense object can be directly selected from the defense objects to serve as the target defense object.

To improve interactivity, in an embodiment, the step of increasing an energy value of a corresponding target defense object among all defense objects in the first interface according to the eliminated pattern objects includes: increasing, according to a pattern type of the eliminated pattern objects, the energy value of the target defense object corresponding to the pattern type in the first interface, where the increased energy value is in direct proportion to the number of the eliminated pattern objects.

For example, each pattern type has a preset association with a corresponding defense object. For example, a triangular pattern is associated with defense object A, a pentagram pattern is associated with defense object B, etc. Each pattern type may be associated with a unique defense object, or associated with multiple defense objects. Each defense object may be associated with a unique pattern type, or may be associated with multiple pattern types. When the pattern objects are eliminated, all target defense objects associated with the pattern type can be found from all the defense objects in the first interface according to the pattern type of the eliminated pattern objects, and then the energy value of the target defense objects is increased, such that the user does not need to select the target defense objects. Moreover, by associating the pattern type of the eliminated pattern objects with the target defense objects, the interactivity and fun of selecting the target defense objects are greatly improved.

For example, the number of the eliminated pattern objects has a preset association with the energy value. For example, if 3 pattern objects are eliminated, the energy value is increased by 100 points; if 4 pattern objects are eliminated, the energy value is increased by 300 points. A specific value by which the energy value is increased may be set according to actual situations. In this way, the user can select a corresponding energy value increasing manner as required, thus improving the fun of the game and the interactivity with the user.

S15: Subtract a second preset health point value from the current health point value of the attack object in response to a skill trigger instruction for the target defense object when the energy value of the target defense object reaches a preset value, where the second preset health point value is greater than the first preset health point value.

In an embodiment, after the energy value of the target defense object reaches the preset value, that is, after the energy slot of the target defense object is full, a skill trigger instruction sent by the user can be received. When the energy value of the target defense object reaches the preset value, if the user's click operation on the target defense object is received, it is determined that a skill trigger instruction is received. In this case, in response to the skill trigger instruction, the target defense object is controlled to enter a gain state, and the target defense object is controlled to attack the attack object, so as to subtract the second preset health point value from the current health point value of the attack object. The gain state refers to a state enabling a defense object to acquire extra capability. The gain state may last a certain period of time, such as 5s, 30s, or 1 minute, which may be set according to actual situations.

When the energy value of the target defense object reaches the preset value, the attack object will be attacked with stronger power, such that the attack object loses more health points, thus improving the killing efficiency in the game.

When the connected pattern objects are eliminated, the energy value of the corresponding target defense object among all the defense objects in the first interface is increased, such that when the energy value of the target defense object reaches the preset value, the attack object is attacked with stronger power, thereby breaking the limitation that only a fixed attack on the attack object can be triggered when the connected pattern objects are eliminated. In this way, the defense object obtains a gain during the elimination of the pattern objects, which improves the interactivity of the game. Moreover, when the energy value of the target defense object reaches the preset value, the attack object is attacked with stronger power, to improve the intensity of the game, which helps to improve the killing efficiency of the game, speed up the game process, and shorten the game duration, thus reducing the processing overheads of the terminal and the server.

To further improve the killing efficiency in the game, in an embodiment, after the pattern objects are eliminated, the increased energy value of the target defense object is equal to a preset value. After the pattern objects are eliminated, the energy value of the target defense object will be directly increased to the preset value, such that the energy value of the target defense object can be increased to the maximum value through single elimination of the pattern objects. It is unnecessary to eliminate pattern objects multiple times, such that the user can trigger the skill trigger instruction more quickly, to further improve the killing efficiency in the game and reduce the game duration.

In an embodiment, the step of subtracting a second preset health point value from the current health point value of the attack object in response to a skill trigger instruction for the target defense object when the energy value of the target defense object reaches a preset value includes: when the energy value of the target defense object reaches the preset value, controlling the target defense object and each defense object within a preset range of the target defense object in the first interface to attack the attack object in response to the skill trigger instruction for the target defense object, so as to subtract the second preset health point value from the current health point value of the attack object.

For example, when the skill trigger instruction is received, in addition to the target defense object, all other defense objects within the preset range in the first interface can enter the gain state. That is, when the skill trigger instruction is received, the target defense object and other defense objects within the preset range enter the gain state, and all the defense objects entering the gain state are controlled to attack the attack object. In this case, the second preset health point value is a sum of the attack power of the target defense object and attack power of other defense objects within the preset range.

In order to further increase the interactivity with the user, in an embodiment, when the skill trigger instruction is received, the skill trigger instruction can be detected. If the skill trigger instruction is a single-click target defense object, the target defense object enters the gain state, and in this case, the second preset health point value is the attack power of the target defense object. If the skill trigger instruction is a double-click target defense object, in addition to the target defense object, all other defense objects within the preset range in the first interface can enter the gain state. That is, when the skill trigger instruction is received, the target defense object and other defense objects within the preset range enter the gain state, and all the defense objects entering the gain state are controlled to attack the attack object. In this case, the second preset health point value is a sum of the attack power of the target defense object and attack power of other defense objects within the preset range.

Optionally, the preset range is an area range including the target defense object. For example, the preset range is a certain area range with the position of the target defense object as a center, e.g., adjacent to the target defense object.

When the energy value of the target defense object reaches the preset value, the defense objects within the preset range can be simultaneously controlled to attack the attack object in response to the skill trigger instruction for the target defense object, such that the method of controlling the defense objects to attack the attack object is more diversified. In addition, the intensity of the battle between each defense object and the attack object is improved, which helps to reduce the time of the game and reduce the processing resources of the terminal and the server occupied by the game.

In an embodiment, the second preset health point value is equal to the current health point value. That is, after receiving the skill trigger instruction for the target defense object once, the attack object is directly killed. It is unnecessary to receive the skill trigger instruction multiple times, such that the attack object can be killed more quickly, thus reducing the duration of the game.

In an embodiment, after the second preset health point value is subtracted from the current health point value of the attack object, the energy value of the target defense object is cleared, that is, the energy slot of the target defense object restores the initial value.

Figure 7:
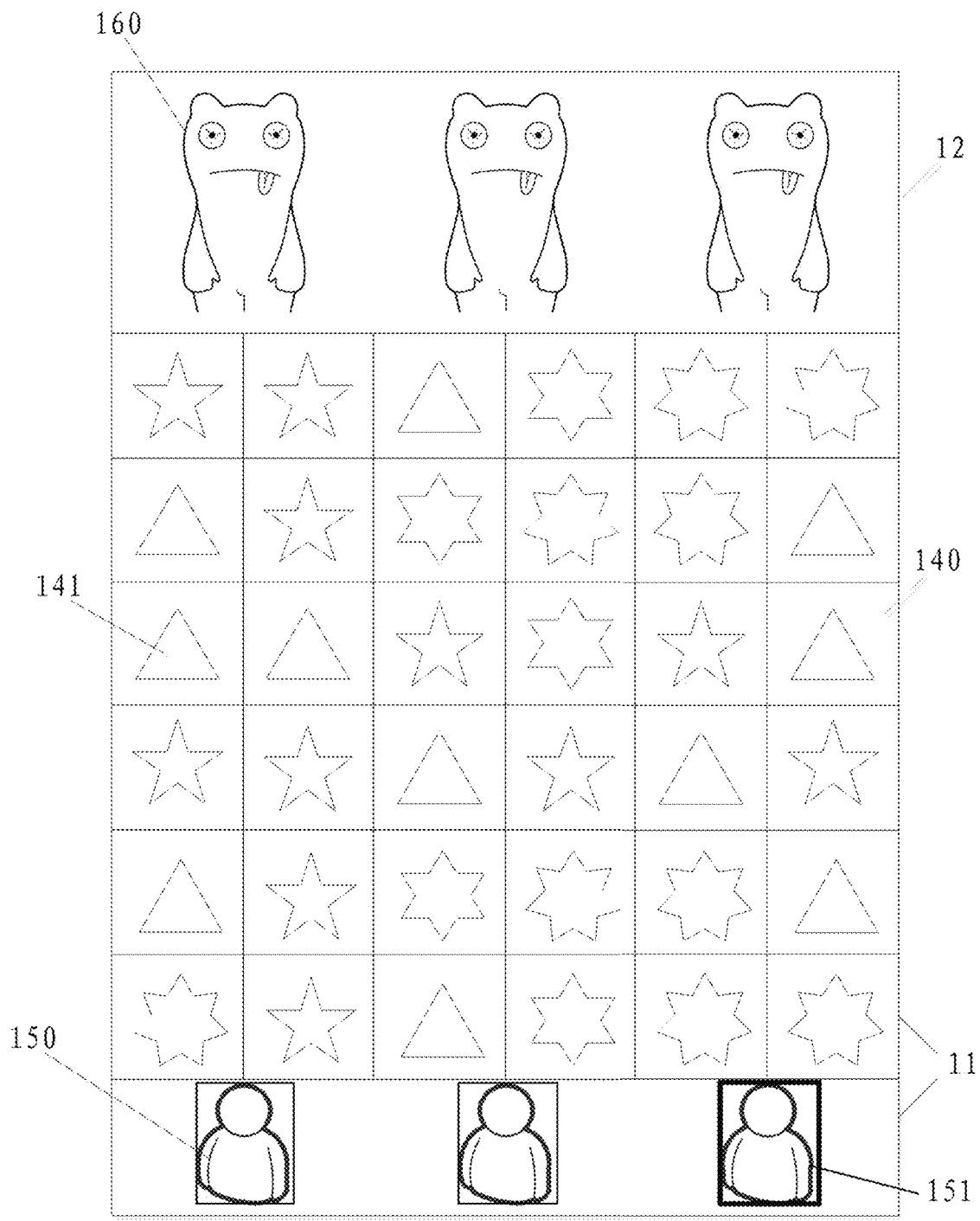
FIG. 7 is a schematic diagram of a second interface after an energy value of a defense object reaches a preset value according to an embodiment.

In an embodiment, to make it convenient for the user to determine whether the selected target defense object can receive the skill trigger instruction to improve the interactivity between the user and the game, in an embodiment, when the energy value of the target defense object reaches the preset value, the target defense object is highlighted in the second interface. The highlighting may be outlining the frame of the target defense object, such that the target defense object is highlighted in the second interface, to help the user to recognize the target defense object, as shown in FIG. 7.

In an embodiment, after the first preset health point value is subtracted from the current health point value of the attack object in the second interface, or subtracting the second preset health point value from the current health point value of the attack object, the method further includes: detecting whether there is any attack object in the second interface, and if yes, controlling the attack object to attack at least one defense object in the first interface when the attack object attacks a preset condition.

In an embodiment, the preset condition may be timing setting for the attack object, e.g., 10s. That is, the attack object is controlled to attack at least one defense object in the first interface at intervals of 10s.

For example, different types of attack objects correspond to different numbers of attacks. For example, when an attack object of a certain type attacks the defense object, one attack will be generated; when an attack object of another type attacks the defense object, two attacks will be generated. The specific number of attacks may be set according to actual situations.

Figure 8:
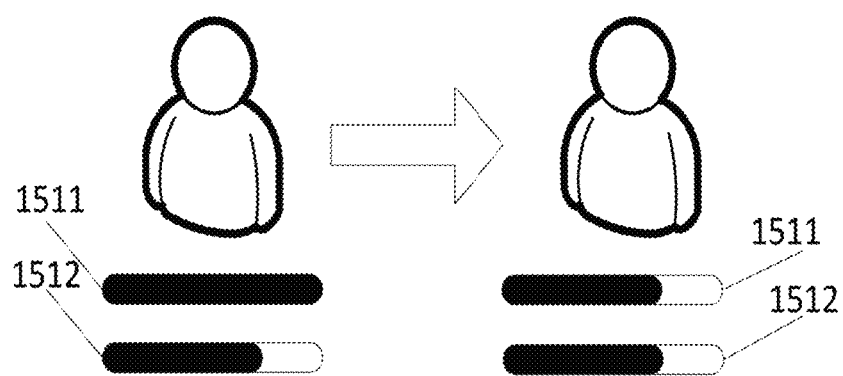
FIG. 8 is a schematic diagram of a health point value of a defense object according to an embodiment.

As shown in FIG. 8, after the attack object attacks the defense object, an attack value of the attack object is subtracted from the current defense value of the defense object, such that the defense object switches from the state shown in the left part of the figure to the state shown in the right part of the figure, and displays the state in the first interface, to inform the user that the attack object has struck an attack.

In an embodiment, the step of controlling the attack object to attack at least one defense object in the first interface when the attack object meets the preset condition includes: when display duration of the attack object in the second interface satisfies a preset condition, controlling the attack object to attack at least one defense object within a preset attack range of the attack object.

For example, the preset condition may be timing setting for the attack object, e.g., 10s. That is, the attack object is controlled to attack at least one defense object in the first interface at intervals of 10s. When the display duration of the attack object in the second interface satisfies the preset condition, the terminal device acquires a preset attack range of the attack object, and attacks all defense objects or a random defense object within the preset attack range of the attack object.

For example, the number of attacks by the attack object is in direct proportion to the display duration of the attack object in the second interface, that is, if the attack object has longer display duration in the second interface, the attack object strikes more attacks. The display duration of the attack object in the second interface is determined based on the current health point value of the attack object; if the current health point value of the attack object is less than the preset value, the attack object disappears in the second interface. When all the attack objects disappear in the second interface and the defense value of the defense object is greater than 0, a target object indicating a victory is displayed on the user interface. The target object may be a picture or an animation representing a game victory.

For example, different types of attack objects correspond to different numbers of attacks. For example, when an attack object of a certain type attacks the defense object, one attack will be generated; when an attack object of another type attacks the defense object, two attacks will be generated. The specific number of attacks may be set according to actual situations.

In order to reduce the area occupied by the first interface while ensuring that the first interface includes sufficient pattern objects for eliminating the attack objects, in an embodiment, after the connected pattern objects are eliminated, the method further includes: according to elimination positions corresponding to the pattern objects, moving pattern objects above the elimination positions downward to fill vacant positions; and generating new pattern objects to fill vacant positions after the downward movement.

After the identical pattern objects are eliminated, there will be vacant grids after the elimination. In this case, the pattern objects above the positions of the eliminated pattern objects are moved to the elimination positions. Then, after the existing pattern objects in the matrix are moved, the matrix still has vacant positions of which the number is the same as that of the eliminated pattern objects. To ensure the number of pattern objects in the matrix, the terminal device generates new pattern objects to fill the vacant positions.

Figure 9:
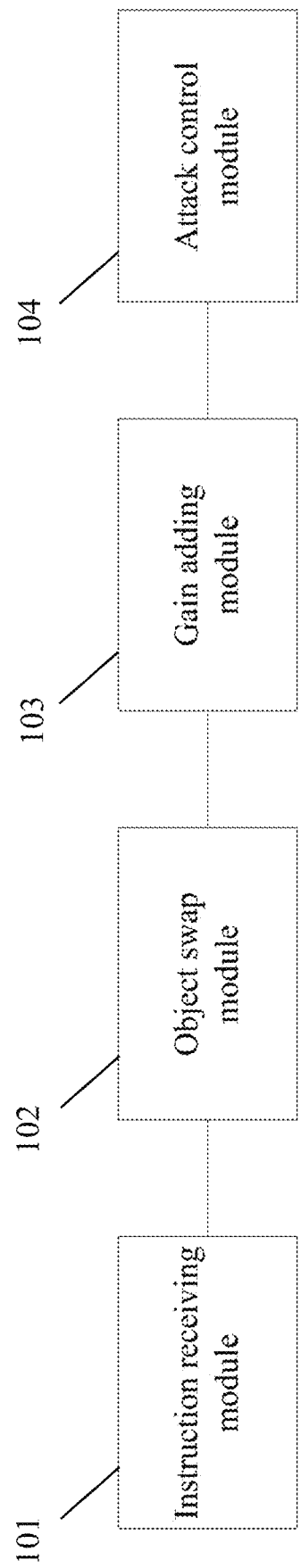
FIG. 9 is a schematic structural diagram of a control apparatus of a virtual object according to an embodiment.

In an embodiment, a control apparatus of a virtual object is provided. As shown in FIG. 9, the apparatus includes:

an instruction receiving module 101, configured to receive an object swap instruction on a pattern matrix of a first interface of a screen, where the object swap instruction is generated according to a sliding operation applied on a first pattern object and a second pattern object that are adjacent in the pattern matrix, the pattern matrix includes multiple matrix elements, and each matrix element is used for displaying a pattern object;

an object swap module 102, configured to swap positions of a first pattern object and a second pattern object according to the object swap instruction, and upon detection that a predetermined number of pattern objects of the same type are connected after the positions of the first pattern object and the second pattern object are swapped, eliminate the connected pattern objects, and subtract a first preset health point value from a current health point value of an attack object in a second interface;

a gain adding module 103, configured to increase an energy value of a corresponding target defense object among all defense objects in the first interface according to the eliminated pattern objects; and an attack control module 104, configured to subtract a second preset health point value from the current health point value of the attack object in response to a skill trigger instruction for the target defense object when the energy value of the target defense object reaches a preset value, where the second preset health point value is greater than the first preset health point value.

In an embodiment, the gain adding module 103 is specifically configured to: increase, according to a pattern type of the eliminated pattern objects, the energy value of the target defense object corresponding to the pattern type in the first interface.

Further, the increased energy value is equal to the preset value.

In an embodiment, the attack control module 104 is specifically configured to: when the energy value of the target defense object reaches the preset value, control the target defense object and each defense object within a preset range of the target defense object in the first interface to attack the attack object in response to the skill trigger instruction for the target defense object, so as to subtract the second preset health point value from the current health point value of the attack object.

In an embodiment, the second preset health point value is equal to the current health point value.

In an embodiment, the attack control module 104 is further configured to: clear the energy value of the target defense object.

In an embodiment, when the energy value of the target defense object reaches the preset value, the target defense object is highlighted in the second interface.

In an embodiment, the attack control module 104 is further configured to: control the attack object to attack at least one defense object in the first interface when the attack object meets a preset condition.

In an embodiment, the attack control module 104 is further configured to: when display duration of the attack object in the second interface meets a preset condition, controlling the attack object to attack at least one defense object within a preset attack range of the attack object.

In an embodiment, the number of attacks by the attack object is in direct proportion with the display duration of the attack object in the second interface, the display duration is determined according to the current health point value of the attack object, and when the current health point value is less than a preset value, the attack object disappears in the second interface.

In an embodiment, the object swap module 102 is further configured to: according to elimination positions corresponding to the pattern objects, move pattern objects above the elimination positions downward to fill the elimination positions; or generate new pattern objects to fill vacant positions after the downward movement.

Figure 10:
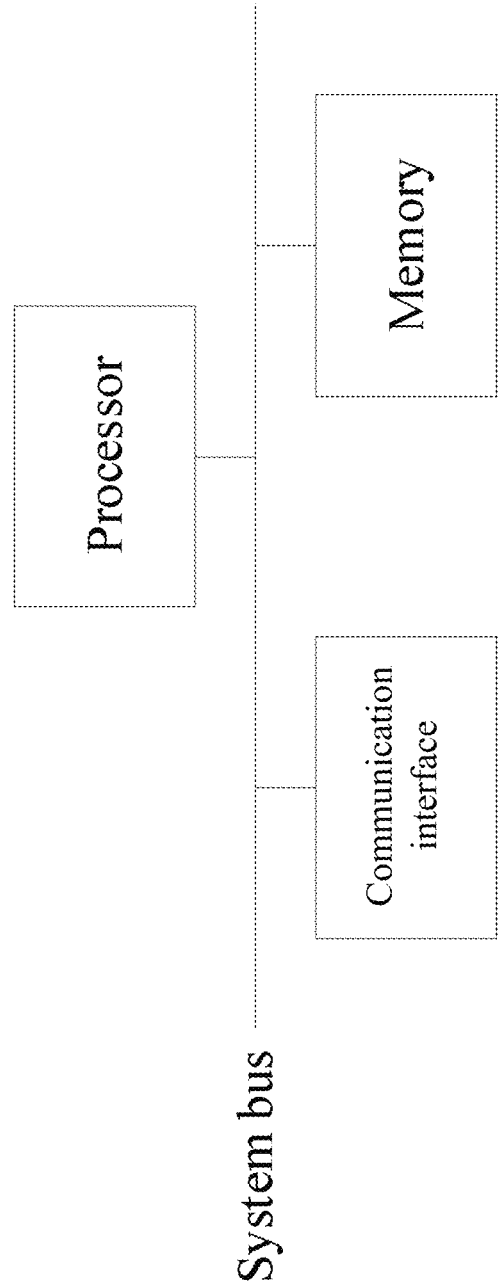
FIG. 10 is a structural block diagram of a computer device according to an embodiment.

In an embodiment, a computer device is provided. As shown in FIG. 10, the computer device includes a processor, a memory, a communication interface, an input apparatus and a display screen that are connected through a system bus. The memory includes a non-volatile storage medium and an internal memory. The non-volatile storage medium of the computer device stores an operating system, and may also store a computer program. The computer program, when executed by the processor, causes the processor to implement the control method of a virtual object. The internal memory may also store a computer program. The computer program, when executed by the processor, may cause the processor to perform the control method of a virtual object. Those skilled in the art may understand that the structure shown in FIG. 10 is only a block diagram of a part of the structure related to the solution of the application and does not constitute a limitation on a computer device to which the solution of the present disclosure is applied. Specifically, the computer device may include more or fewer components than those shown in the figures, or combine some components, or have different component arrangements.

In an embodiment, the control apparatus of a virtual object provided in the present disclosure may be implemented in the form of a computer program. The computer program may be run on the computer device shown in FIG. 10. The memory of the computer device may store various program modules forming the control apparatus of a virtual object. The computer program formed by the program modules causes a processor to perform the steps of the control method of a virtual object according to the embodiments of the present disclosure as described in this specification. The program modules include: an instruction receiving module 101, an object swap module 102, a gain adding module 103, and an attack control module 104.

In an embodiment, a storage medium is provided. The storage medium stores a computer executable instruction. The computer executable instruction causes a computer to perform steps of the foregoing control method of a virtual object. The steps of the control method of a virtual object herein may be steps in the control method of a virtual object in the foregoing embodiments.

The above merely describes preferred embodiments of the present application. It should be noted that, several improvements and modifications may be made by those of ordinary skill in the art without departing from the principle of the present application, and these improvements and modifications should also be considered within the scope of protection of the present invention.

A person of ordinary skill in the art may understand that all or some of the procedures in the methods of the foregoing embodiments may be implemented by a computer program instructing related hardware. The program may be stored in a computer readable storage medium. When the program is executed, the procedures in the embodiments of the foregoing methods may be performed. The storage medium may be a magnetic disk, an optical disc, a read-only memory (ROM), a random access memory (RAM), or the like.

The invention claimed is:

1. A control method of a virtual object, applied to a terminal device, comprising:
    receiving an object swap instruction on a pattern matrix of a first interface of a screen, wherein the pattern matrix comprises multiple matrix elements, and each matrix element is used for displaying a pattern object;
    swapping positions of a first pattern object and a second pattern object according to the object swap instruction, and upon detection that a predetermined number of pattern objects of the same type are connected, eliminating the connected pattern objects, and subtracting a first preset health point value from a current health point value of an attack object in a second interface;
    increasing an energy value of a corresponding target defense object among all defense objects in the first interface according to the eliminated pattern objects; and
    subtracting a second preset health point value from the current health point value of the attack object in response to a skill trigger instruction for the target defense object when the energy value of the target defense object reaches a preset value, wherein the second preset health point value is greater than the first preset health point value;
    wherein the subtracting a second preset health point value from the current health point value of the attack object in response to a skill trigger instruction for the target defense object when the energy value of the target defense object reaches a preset value comprises:
    when the energy value of the target defense object reaches the preset value, controlling the target defense object and each defense object within a preset range of the target defense object in the first interface to attack the attack object in response to the skill trigger instruction for the target defense object, so as to subtract the second preset health point value from the current health point value of the attack object.

2. The control method of a virtual object according to claim 1, wherein the increasing an energy value of a corresponding target defense object among all defense objects in the first interface according to the eliminated pattern objects comprises:
    increasing, according to a pattern type of the eliminated pattern objects, the energy value of the target defense object corresponding to the pattern type in the first interface, wherein the increased energy value is in direct proportion to the number of the eliminated pattern objects.

3. The control method of a virtual object according to claim 1, wherein the increased energy value is equal to the preset value.

4. The control method of a virtual object according to claim 1, wherein the second preset health point value is equal to the current health point value.

5. The control method of a virtual object according to claim 1, further comprising:
    when display duration of the attack object in the second interface meets a preset condition, controlling the attack object to attack at least one defense object within a preset attack range of the attack object.

6. The control method of a virtual object according to claim 5, wherein the number of attacks by the attack object is in direct proportion with the display duration of the attack object in the second interface, the display duration is determined according to the current health point value of the attack object, and when the current health point value is less than a preset value, the attack object disappears in the second interface.

7. A control apparatus of a virtual object, comprising:
    an instruction receiving module, configured to receive an object swap instruction on a pattern matrix of a first interface of a screen, wherein the pattern matrix comprises multiple matrix elements, and each matrix element is used for displaying a pattern object;
    an object swap module, configured to swap positions of a first pattern object and a second pattern object according to the object swap instruction, and upon detection that a predetermined number of pattern objects of the same type are connected, eliminate the connected pattern objects, and subtract a first preset health point value from a current health point value of an attack object in a second interface;
    a gain adding module, configured to increase an energy value of a corresponding target defense object among all defense objects in the first interface according to the eliminated pattern objects; and
    an attack control module, configured to subtract a second preset health point value from the current health point value of the attack object in response to a skill trigger instruction for the target defense object when the energy value of the target defense object reaches a preset value, wherein the second preset health point value is greater than the first preset health point value;
    wherein the attack control module is further configured to:
    when the energy value of the target defense object reaches the preset value, control the target defense object and each defense object within a preset range of the target defense object in the first interface to attack the attack object in response to the skill trigger instruction for the target defense object, so as to subtract the second preset health point value from the current health point value of the attack object.

8. An electronic device, comprising: a memory, a processor, and a computer program stored in the memory and runnable on the processor, wherein the processor, when executing the computer program, implements the control method of a virtual object as defined in claim 1.

9. A non-transitory storage medium, wherein the non-transitory storage medium stores a computer program, the computer program is suitable to be loaded and executed by a processor, to cause a computer device equipped with the processor to perform the control method of a virtual object as defined in claim 1.

* * * * *